(12) United States Patent
Takagi et al.

(10) Patent No.: US 8,482,684 B2
(45) Date of Patent: Jul. 9, 2013

(54) STEREOSCOPIC IMAGE DISPLAY APPARATUS

(75) Inventors: Ayako Takagi, Yokosuka (JP); Masako Kashiwagi, Yokohama (JP); Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 13/302,888

(22) Filed: Nov. 22, 2011

(65) Prior Publication Data

US 2012/0069255 A1  Mar. 22, 2012

Related U.S. Application Data

(63) Continuation of application No. PCT/JP2009/004936, filed on Sep. 28, 2009.

(51) Int. Cl.
*G02F 1/1335* (2006.01)

(52) U.S. Cl.
USPC .......................................................... 349/15

(58) Field of Classification Search
USPC .......................................................... 349/15
See application file for complete search history.

(56) References Cited

U.S. PATENT DOCUMENTS

| | | | |
|---|---|---|---|
| 5,493,427 A | 2/1996 | Nomura et al. | |
| 7,250,923 B2 | 7/2007 | Taira et al. | |
| 2008/0259233 A1* | 10/2008 | Krijn et al. | 349/15 |
| 2008/0266387 A1 | 10/2008 | Krijn et al. | |
| 2010/0238276 A1 | 9/2010 | Takagi et al. | |

FOREIGN PATENT DOCUMENTS

| | | |
|---|---|---|
| CN | 101444105 | 5/2009 |
| JP | 7-77748 | 3/1995 |
| JP | 2000-102038 | 4/2000 |
| JP | 2002-214579 | 7/2002 |
| JP | 2009-520231 | 5/2009 |
| WO | WO 2007/072289 A2 | 6/2007 |

OTHER PUBLICATIONS

International Search Report from Japanese Patent Office for International Application No. PCT/JP2009/004936, Mailed Oct. 27, 2009.
Kowel et al., "Focusing by electrical modulation of refraction in a liquid crystal cell," Applied Optics (Jan. 15, 1984), 23:278-289.
International Preliminary Report on Patentability and Written Opinion issued by the International Bureau of WIPO on Apr. 11, 2012.

* cited by examiner

*Primary Examiner* — Wen-Ying P Chen
(74) *Attorney, Agent, or Firm* — Finnegan, Henderson, Farabow, Garrett & Dunner, L.L.P.

(57) ABSTRACT

A stereoscopic image display apparatus is structured such that strip-shaped electrodes opposing a planar electrode and having end electrodes and a center electrode are disposed at intervals in a pitch direction of the liquid crystal lens array, such that a potential difference between the planar electrode and the center electrode is set smaller than a rising voltage Vth of the liquid crystal layer and a third voltage V3 larger in absolute value than a first voltage V1 applied to the planar electrode and a second voltage V2 applied to the center electrode and also larger than the rising voltage is applied to the end electrodes, and such that the relation $0.075 < ws < 0.15$ and $0.15 < wg < 0.29$ is satisfied, where the width of the end electrodes is ws and the width of the center electrode is wg when the length of the lens array is 1.

9 Claims, 7 Drawing Sheets

STEREOSCOPIC IMAGE DISPLAY APPARATUS

CROSS-REFERENCE TO RELATED APPLICATIONS

This application is a continuation of prior International Application No. PCT/JP2009/004936, filed on Sep. 28, 2009; the entire contents of all of which are incorporated herein by reference.

FIELD

Embodiments described herein relate generally to stereoscopic image display apparatus.

BACKGROUND

There is a stereoscopic image display method using a two-dimensional flat panel display device which combines and displays images from a plurality of visual line directions on an image display surface so as to allow a viewer to selectively-visually recognize the image corresponding to the viewpoint position of the viewer.

As a method of displaying a stereoscopic image, there is a twin-lens type which provides displayed images as two images to be observed at the viewpoint positions of a left and right eye, and a multiple-lens type which likewise provides displayed images as multiple images at plural viewpoint positions. Further, there is an integral photography method (IP method) which combines and displays images on an image display surface with respect to numerous visual directions without the consideration of viewpoint positions. Moreover, there is an integral imaging method (II method) applying the integral photography method and using a FPD.

As means for selecting an image, there are known a method to provide sets of optical shielding parts and opening parts in a shape of pin hole or slit in an array form, and a method to provide a lens array or a lenticular lens array on an image display screen with the image location of a lens being at a pixel position. In view of display luminance, the image selection means cause the display luminance to be decreased due to the existence of the shielding parts, and thus it is desirable to use a lens as the means for the image selection.

On the other hand, in order to respond to demands for displaying a two-dimensional image and a stereoscopic image selectively using the same display apparatus, there are approaches to display a two-dimensional image and a stereoscopic image selectively. In a structure using a lens array for image selection means, lenses are structured as a refractive index variable layer for allowing the switching of lens operation. A liquid crystal lens in which the orientation of liquid crystal is controlled in voltage is used as refractive index control achieving means. By the switching of lens operation, it becomes possible to display an image at the original resolution, which is owned by the two-dimensional planar image display apparatus when a two-dimensional image is displayed.

Further, there are increasing demands for selectively displaying a two-dimensional image and a stereoscopic image on a display of a personal computer or a digital terminal. However, in such an apparatus, the viewing distance between the display and a viewer is quite short within a range of about 40 cm to 70 cm. In order to achieve a stereoscopic image via such a short viewing distance, a very wide visual field angle is required. In the current situation, however, a lens, particularly a liquid crystal lens, that can achieve such a wide visual field angle has not been achieved yet.

DETAILED DESCRIPTION

According to one embodiment, a stereoscopic image display apparatus includes: an image display unit having a plurality of pixels and emitting an image light having a polarized light; and a liquid crystal lens array provided on an emitting side of the image light of the image display unit, in which the liquid crystal lens array includes a pair of transparent substrates provided opposite to each other across a liquid crystal layer, a planar electrode provided on one of the pair of transparent substrates, and strip-shaped electrodes provided on the other of the pair of transparent substrates at respective corresponding positions of the liquid crystal lens array, in which the strip-shaped electrodes are disposed at intervals in a pitch direction of the liquid crystal lens array such that end electrodes are located at both ends of each liquid crystal lens, and a center electrode is located at a center part of the liquid crystal lens, a potential difference between the planar electrode and the center electrode is set smaller than a rising voltage Vth of the liquid crystal layer, a third voltage V3 larger in absolute value than a first voltage V1 applied to the planar electrode and a second voltage V2 applied to the center electrode and also larger than the rising voltage is applied to the end electrodes, and with the length of each liquid crystal lens in a pitch direction of the liquid crystal lens array being 1, the relation 0.075<ws<0.15 and 0.15<wg<0.29 is satisfied, where the width of the end electrodes is ws, and the width of the center electrode is wg.

Hereinafter, details of the present invention as well as other features and advantages will be described based on embodiments.

(First Embodiment)

Figure 1:
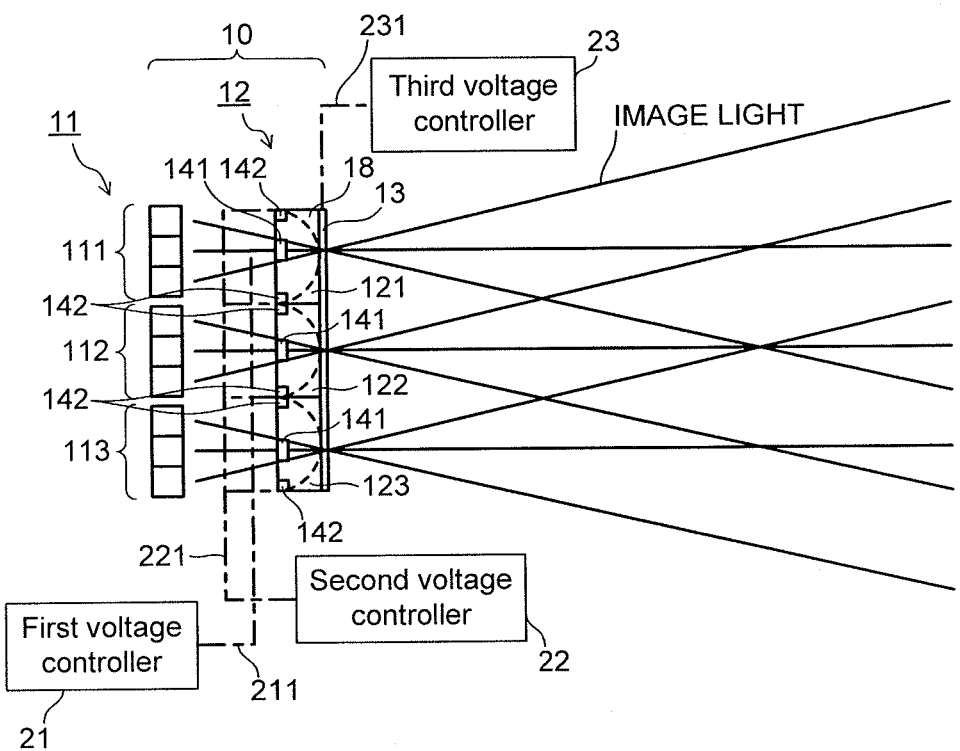
FIG. 1 is a stereoscopic image display apparatus of a first embodiment.
Figure 2:
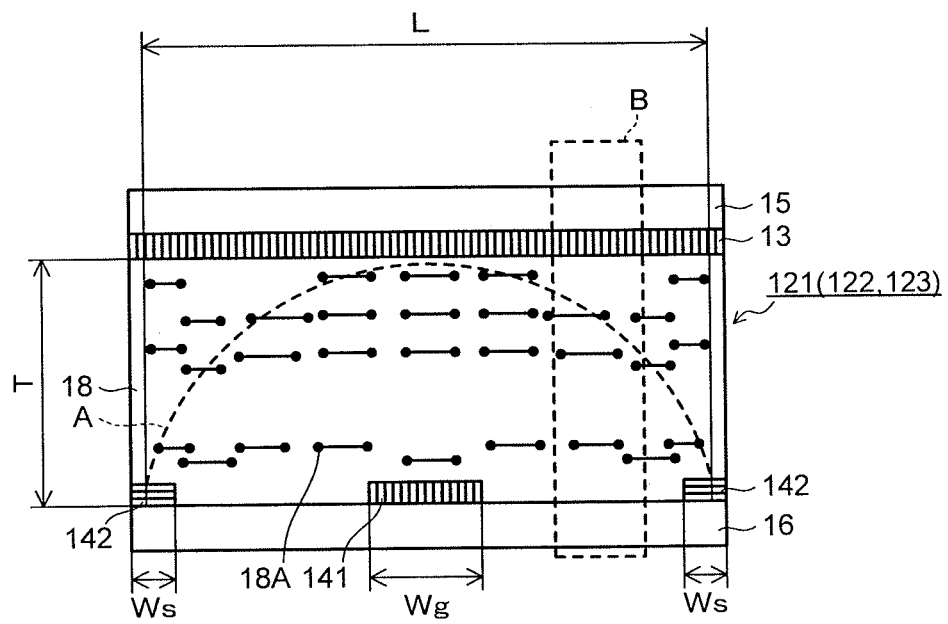
FIG. 2 is a cross-sectional structural view in a lens pitch direction illustrating one liquid crystal lens picked out of a liquid crystal lens array.
Figure 3:
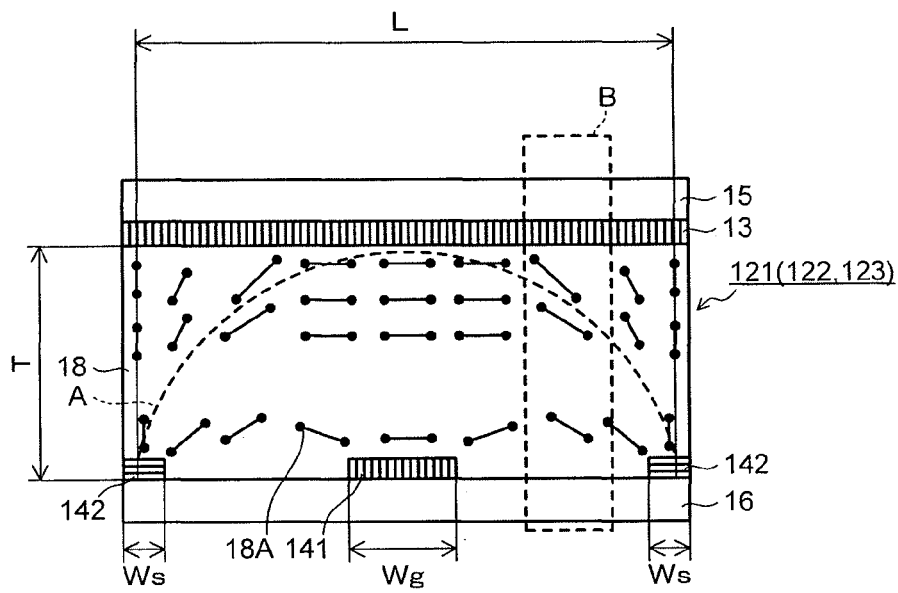
FIG. 3 is a cross-sectional structural view in a lens pitch direction illustrating one liquid crystal lens picked out of the liquid crystal lens array.

FIG. 1 is a diagram illustrating a schematic structure of a stereoscopic image display apparatus of this embodiment. FIG. 2 and FIG. 3 are cross-sectional structural views in a lens pitch direction illustrating one liquid crystal lens picked out of a liquid crystal lens array in the stereoscopic image display apparatus illustrated in FIG. 1. FIG. 2 illustrates a state where no voltage is applied to a liquid crystal layer of the liquid crystal lens and directors of the liquid crystal are in parallel with transparent substrates (glass substrates) enclosing the liquid crystal. FIG. 3 illustrates a state where a voltage is applied to the liquid crystal layer of the liquid crystal lens, and the directors of the liquid crystal change in a thickness direction of the liquid crystal layer to function as a liquid crystal lens. Note that in FIG. 1, for simplicity, the transparent substrates enclosing the liquid crystal are omitted.

As illustrated in FIG. 1, a stereoscopic image display apparatus 10 of this embodiment has an LCD 11 as an image display unit, and a liquid crystal lens array 12 having three liquid crystal lenses disposed on an emitting side of an image light emitted from this LCD 11. With not-illustrated polarizing plates being provided on both faces of the LCD 11, the apparatus is structured to emit an image light having a polarized light. In addition, the LCD 11 has a plurality of pixels, and these pixels are divided into three pixel groups 111, 112, 113. The respective liquid crystal lenses forming the liquid crystal lens array are provided corresponding to these pixel groups 111, 112, 113, respectively.

Note that in this embodiment, although the liquid crystal lens array is structured from three liquid crystal lenses, the number is not limited thereto. Further, although the plurality of pixels forming the LCD 11 form pixel groups, it is not restrictive, and any mode can be employed as necessary.

Further, on the face of the liquid crystal lens array 12 opposite to the LCD 11, a planar electrode 13 is formed. Moreover, on the face of the liquid crystal lens array 12 on the side of the LCD 11, strip-shaped electrodes 141 and 142 are provided to extend orthogonally to the lens pitch direction. The strip-shaped electrodes 141 are electrically connected via a wire 211 with a first voltage controller 21 which is provided in separation from the liquid crystal lens array 12. The strip-shaped electrodes 142 are electrically connected via a wire 221 with a second voltage controller 22 which is provided in separation from the liquid crystal lens array 12. Moreover, the planer electrode 13 is electrically connected via a wire 231 with a third voltage controller 23 which is provided in separation with the liquid crystal lens array 12. The first through third voltage controllers 21 to 23 control the electric potentials (applying voltages) of the strip-shaped electrodes 141, 142 and the planer electrode 13, respectively, so as to control the directors in the liquid crystal layer of the liquid crystal lens array 12 as will be described hereinafter. Here, the wires 211, 221 and 231 are depicted by the respective chain lines. The strip-shaped electrodes 141 and 142 are disposed at predetermined intervals in the lens pitch direction.

In the liquid crystal lens array 12, the refractive index of a center part of each liquid crystal lens forming the array and the refractive index of an end part thereof differ largely one another. The liquid crystal lens array 12 has a large refractive power so as to function as a lens capable of generating an ideal retardation. Therefore, the image light emitted from the liquid crystal lens array 12 is largely polarized upon the reception of the refractive power, and widely spread to obtain a large visual field angle.

Next, referring to the cross-sectional structural views of the liquid crystal lens illustrated in FIG. 2 and FIG. 3, the above-described operation and effect will be described in detail. Note that the polarization direction of the image light emitted from the LCD 11 is rendered to match with the directors 18A of the liquid crystal layer 18 of the liquid crystal lens 121 (122, 123).

As illustrated in FIG. 2 and FIG. 3, in each liquid crystal lens 121 (122, 123), the liquid crystal layer 18 is sandwiched (enclosed) by the pair of transparent substrates 15 and 16 (for example, glass substrates). On the transparent substrate 15, the above-described planar electrode 13 is provided opposite to the liquid crystal layer 18. On the transparent substrate 16, the above-described strip-shaped electrodes 141 and 142 are provided opposite to the liquid crystal layer 18.

In addition, the strip-shaped electrode 141 is disposed in a center part of the liquid crystal lens 121 (122, 123) to form a center electrode. The strip-shaped electrodes 142 are disposed on both ends of the liquid crystal lens 121 (122, 123) to form end electrodes.

When rubbing processing is performed in parallel to the main surfaces of the transparent electrodes 15 and 16 in a state where no voltage is applied across the planar electrode 13, the center electrode 141 and the end electrodes 142, the directors 18A of the liquid crystal of the liquid crystal layer 18 are in parallel with the main surfaces of the transparent electrodes 15 and 16, as illustrated in FIG. 2. In this case, in the liquid crystal lens 121 (122, 123), the birefringence originating in the directors 18A of the liquid crystal in the lens pitch direction (occurring in a direction orthogonal to the axis of the directors 18A) becomes constant. Therefore, almost no refractive index distribution occurs in the lens pitch direction of the liquid crystal lens 121 (122, 123). In the state as illustrated in FIG. 2, the liquid crystal lens 121 (122, 123) does not actually exhibit the function as a lens.

On the other hand, for example, the planar electrode 13 is set to ground potential (voltage V1) by the third voltage controller 23. The center electrode 141 is set to ground potential (voltage V2) by the first voltage controller 21. To the end electrodes 142, a voltage V3 larger than a rising voltage Vth of the liquid crystal in the liquid crystal layer 18 is applied by the second voltage controller 22. As illustrated in FIG. 3, in the vicinity of the end electrodes 142, the liquid crystal rises and the directors 18A face upward. Further, the directors 18A become in parallel with the main surfaces of the transparent substrates 15 and 16 as the directors 18A are closer to the upper area of the center electrode 141 of the planar electrode 13.

In an end part of the liquid crystal lens 121 (122, 123), the image light emitted from the LCD 11 in a state where its polarized light direction matches with the directions of the directors 18A in the liquid crystal layer 18 has a small ratio of perpendicularly crossing the directors 18A of the liquid crystal and hence is not affected so much by the birefringence, and the refractive index with respect to the image light becomes relatively low. On the other hand, the ratio of the image light emitted from the LCD 11 perpendicularly crossing the directors 18A of the liquid crystal becomes higher in the closer area to the center of the liquid crystal lens 121 (122, 123), which is hence affected largely by the birefringence, resulting in a relatively high refractive index with respect to the image light.

As a result, in the liquid crystal lens 121 (122, 123), a large refractive index distribution as denoted by a dashed line A occurs. Incidentally, the refractive index is higher in the closer area to the upper side, and the refractive index is lower in the closer area to the lower side. Therefore, the large refractive index distribution A as described above occurs in the liquid crystal lens 121 (122, 123). The liquid crystal lens 121 (122, 123) has large refractive power due to the refractive index distribution A. Thus, based on a difference in incident position of the image light emitted from the LCD 11 on the liquid crystal lens 121 (122, 123), the polarization of the image light differs largely. Consequently, the visual field angle of the liquid crystal lens array 12 increases.

In this manner, having the refractive index distribution A internally as described above, the liquid crystal lens 121 (122, 123) exhibits a polarization operation as described above, and thus exhibits the function as a lens in practice in the case of the structure as illustrated in FIG. 3.

Note that as is clear from the above description, in this embodiment, as illustrated in FIG. 2 and FIG. 3, the refractive index distribution is generated in the liquid crystal layer 18 of the liquid crystal lens 121 (122, 123) by performing voltage application to the end electrodes 142, so as to exhibit the original function of a liquid crystal lens for displaying a stereoscopic image (three-dimensional image). On the other hand, the displaying of a planar image (two-dimensional image) can be achieved by providing a liquid crystal director distribution as illustrated in FIG. 2 without performing voltage application to the end electrodes 142.

Next, examples of this embodiment will be described. FIG. 4 to FIG. 7 are graphs illustrating refractive index distributions in the lens pitch direction of the liquid crystal lens 121 (122, 123). Note that in this embodiment, the liquid crystal lens 121 (122, 123) is divided into three areas (lower part, middle part, upper part) in the thickness direction. There are illustrated refractive index distributions in the lens pitch direction in the respective divided areas and the refractive index distribution across the entire thickness direction of the liquid crystal lens 121 (122, 123) combining these refractive index distributions. Note that in each diagram, an ideal refractive index distribution obtained with equation (1) is illustrated together.

Note that the ratio L/T of the pitch L (for example, 0.35) mm to the thickness T (for example, 0.1) mm of the liquid crystal lens 121 (122, 123) is set to 3 (L/T=3), and the above-described division is performed evenly by ⅓ L in the thickness direction. Further, as the liquid crystal, one having the following properties was used.
<Example of Physical Properties of Liquid Crystal>
Elastic coefficients: K11 for spreading deformation, K22 for twisting deformation, K33 for bending deformation $\epsilon 2$ (dielectric constant in the director direction of liquid crystal) $\epsilon 1$(dielectric constant in a direction perpendicular to the directors of liquid crystal)
Ne refractive index in the director direction of liquid crystal
No refractive index in a direction perpendicular to the director direction of liquid crystal
Γ coefficient of rotational viscosity
With these definitions, it is possible to obtain a desired refractive index distribution in this structure with general liquid crystal by appropriately changing a voltage. It is desired to keep the voltage applied to the liquid crystal as low as possible. In order for all directors to rise in a power supply upper part in a liquid crystal GRIN lens even though the thickness of liquid crystal becomes thick, $\Delta\epsilon = \epsilon 1 - \epsilon 2 \geq 6$ is desired. Further, the coefficient of rotational viscosity Γ>0.1 [mPa/s] is desired. It is desired that in the liquid crystal GRIN lens, the director distribution changes gradually in inclination according to a magnetic field distribution. This is because when the viscosity is low, a rapid change may locally occur with respect to the inclination of the directors. K11 from 13 to 15, K22 from 6 to 8, and K33 from 14 to 18 are used, which are general values of liquid crystal.

Further, the width wg of the center electrode and the width ws of the end electrode were set to 80 μm and 30 μm (0.229 and 0.086, respectively when pitch L is 1 in the example), or 30 μm and 30 μm (0.086 and 0.086, respectively when pitch L is 1 in the comparative example).

Figure 4:
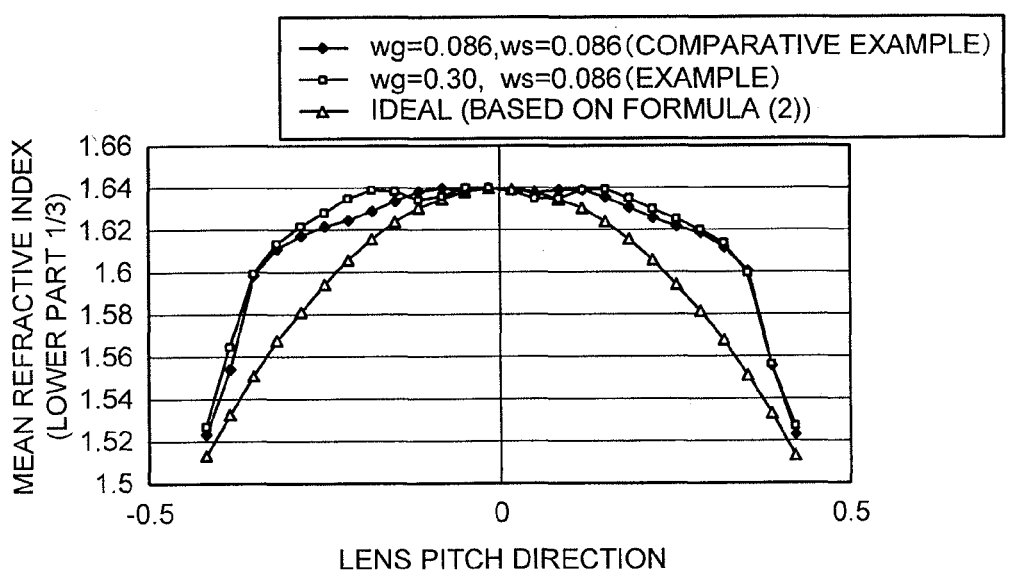
FIG. 4 is a refractive index distribution in a lens pitch direction of the liquid crystal lens.

As illustrated in FIG. 4, it can be seen that the refractive index distribution obtained in the lower part of the liquid crystal lens 121 (122, 123) is relatively higher than the ideal refractive index distribution in both the example and the comparative example. Further, it can be seen that a high refractive index is exhibited particularly in the vicinity of the center part in the lens pitch direction of the liquid crystal lens 121 (122, 123).

Figure 5:
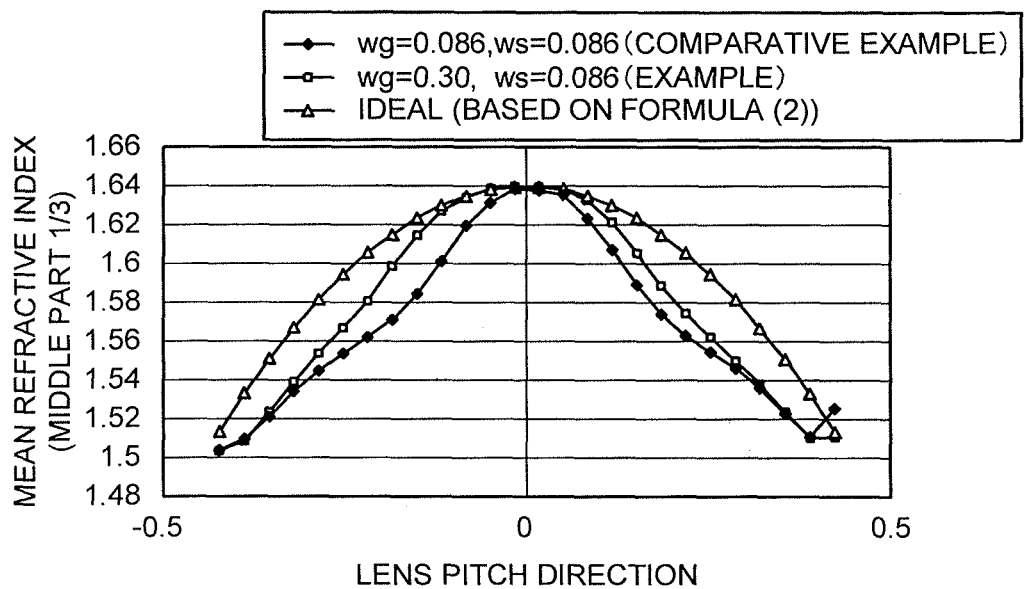
FIG. 5 is a refractive index distribution in a lens pitch direction of the liquid crystal lens.
Figure 6:
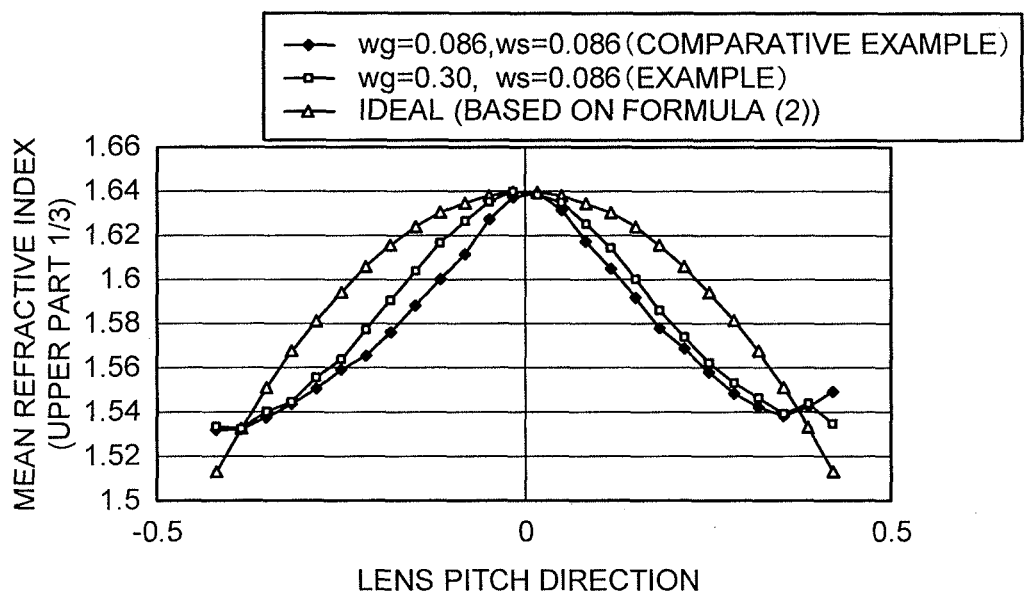
FIG. 6 is a refractive index distribution in a lens pitch direction of the liquid crystal lens.

Further, as illustrated in FIG. 5 and FIG. 6, it can be seen that the refractive index distribution obtained in the middle part and the upper part of the liquid crystal lens 121 (122, 123) is relatively lower than the ideal refractive index distribution in both the example and the comparative example. Further, it can be seen that the refractive index particularly in the vicinity of the center part in the lens pitch direction of the liquid crystal lens 121 (122, 123) is significantly smaller than the ideal refractive index distribution.

Figure 7:
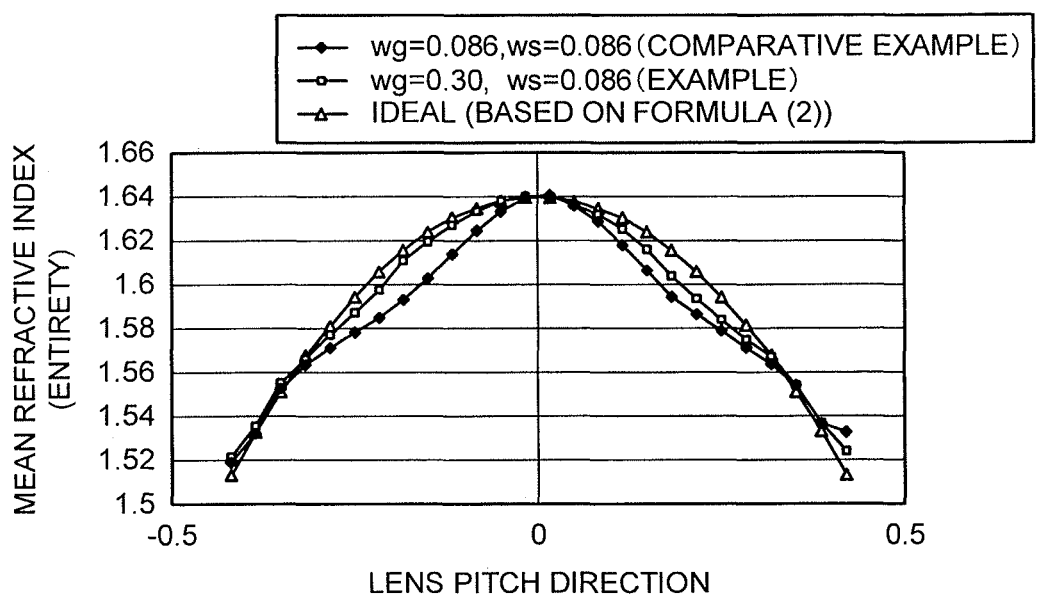
FIG. 7 is a refractive index distribution in a lens pitch direction of the liquid crystal lens.

From the above, in the refractive index distribution across the entire thickness direction of the liquid crystal lens 121 (122, 123), as illustrated in FIG. 7, particularly the high refractive index in the vicinity of the center part in the refractive index distribution of the lower part illustrated in FIG. 4 and the low refractive index in the vicinity of the center part in the refractive index distribution of the middle part and the upper part illustrated in FIG. 5 and FIG. 6 cancel out each other. It can be seen that a refractive index distribution substantially equal to the ideal refractive index distribution is exhibited particularly in the case of the example. Therefore, it can be seen that a desired refractive index distribution in which the visual field angle increases as described above can be obtained, and the lens functions as an ideal lens.

On the other hand, in the case of the comparative example, it can be seen that it has an inflection point particularly in the position separated by a pitch of about ±0.25 from the center in the lens pitch direction of the liquid crystal lens 121 (122, 123), there is a large difference from the ideal refractive index distribution, and the ideal liquid crystal lens cannot be obtained.

Note that although the center electrode 141 is set to ground potential in this example, it can be lower than the ground potential and higher than the potential corresponding to the negative voltage that is equal in absolute value to the rising voltage Vth of the liquid crystal of the liquid crystal layer 18 but has a different polarity. Specifically, 0>Vcp>−Vth where Vcp is the potential of the center electrode 141. This is effective when the distances between the center electrode 141 and the end electrodes 142 increase. Specifically, when the distances between the center electrode 141 and the end electrodes 142 increase, an electric field originating from a voltage applied therebetween becomes small, so that the directors of the liquid crystal do not become horizontal but face upward. In this case, as described above, it is not possible to obtain the ideal refractive index distribution for functioning as a liquid crystal lens that increases the visual field angle.

However, when the potential of the center electrode 141 is set as described above, even though the distances between the center electrode 141 and the end electrodes 142 increase, the electric field originating from a voltage applied therebetween increases, so that the directors of the liquid crystal become horizontal, and it is possible to obtain the refractive index distribution for functioning as a liquid crystal lens that increases the visual field angle.

Note that the reason of Vcp>−Vth is that if the potential of the center electrode 141 is Vcp−Vth, a voltage equal to or larger than the rising potential of the liquid crystal is substantially applied between the planar electrode 13 and the center electrode 141, so that the directors of the liquid crystal are oriented upward, and thus as described above it is not possible to obtain the refractive index distribution for functioning as a liquid crystal lens that increases the visual field angle.

Incidentally, the refractive index distributions for the example and the comparative example illustrated in FIG. 4 to FIG. 7 were implemented using a commercially available liquid crystal simulator. As conditions used in the simulation, the pitch L of the liquid crystal lens 121 (122, 123) was set in a range of 0.17 mm to 0.7 mm, and the height L was set in a range of 0.025 mm to 0.2 mm. Further, the elastic coefficient K11 related to spreading deformation of the liquid crystal layer 18 was set to 14, the elastic coefficient K22 for twisting deformation was set to 7, and the elastic coefficient K33 for bending deformation was set to 17. Moreover, the dielectric constant ε2 in the director 18A direction of the liquid crystal layer 18 was set to 3, and the dielectric constant ε1 in a direction perpendicular to the director 18A direction was set to 9. Further, the voltage to be applied to the end electrodes 142 was set in a range of 5 V to 12 V.

In the simulation, since only the director distribution of the liquid crystal is obtained, and thus the actual refractive index distribution was implemented using the following formula (1).

[Formula 1]

$$N(\theta) = \frac{N_e N_o}{\sqrt{N_e^2 \sin^2\theta + N_o^2 \cos^2\theta}} \quad (1)$$

Here, Ne denotes a refractive index in the director 18A direction of the liquid crystal, and $N_o$ indicates a refractive index in a direction perpendicular to the director 18A direction of the liquid crystal. Further, θ is an angle between a light ray (image light) emitted from the LCD 11 and the directors 18A of the liquid crystal.

Further, the ideal refractive index distribution in the liquid crystal lens is represented by the following formula (2), where ne is the refractive index in a major axis direction of the liquid crystal in the liquid crystal layer 18 and $n_o$ is the refractive index in a minor axis direction (e.g., refer to APPLIED OPTICS, Vol. 23, No. 2, 15 Jan. 1984, "Focusing by electrical modulation of refraction in a liquid crystal cell").

[Formula 2]

$$n(x) = n_e + \left\{ \frac{n_o - n_e}{\left(\frac{L}{2}\right)^2} \right\} x^2 \quad (2)$$

Here, X is a coordinate axis taken along the lens pitch direction of each liquid crystal lens 121 (122, 123), and changes in a range of 0≦X≦L.

Thus, in either of the example and the comparative example, each liquid crystal lens 121 (122, 123) has a refractive index distribution across its entire thickness direction, and thus a large visual field angle can be obtained.

On the other hand, in the case of the example, the refractive index distribution exhibits a shape substantially close to the ideal refractive index distribution represented by the formula (1) across the entire thickness direction of each liquid crystal lens 121 (122, 123), but in the case of the comparative example, the refractive index distribution has a shape slightly different from the refractive index distribution represented by the formula (1) across the entire thickness direction of each liquid crystal lens 121 (122, 123). It can be seen that particularly at a position moved by about ¼ pitch (¼ L) from the center part of each liquid crystal lens 121 (122, 123), an inflection point occurs in the refractive index distribution so that the refractive index distribution has a distorted shape compared to the above-described ideal refractive index distribution.

Therefore, in the case of the comparative example, parallax images emitted from adjacent pixels of the LCD 11 illustrated in FIG. 1 interfere with each other and crosstalk increases, resulting in the decrease of resolution.

Next, the crosstalk in the stereoscopic image display apparatus 10 in this embodiment will be discussed. The crosstalk can be represented by (Iwhite−Imain)/Iwhite. Imain refers to luminance in a parallax image when one pixel lights up, and Iwhite refers to luminance when all the pixels light up.

Figure 8:
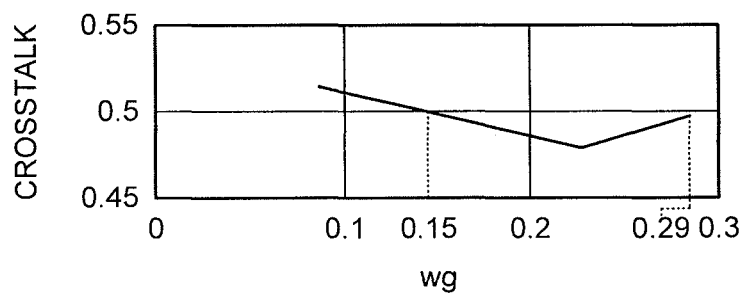
FIG. 8 is a graph showing crosstalk dependence with respect to the width wg of a center electrode of the liquid crystal lens.
Figure 9:
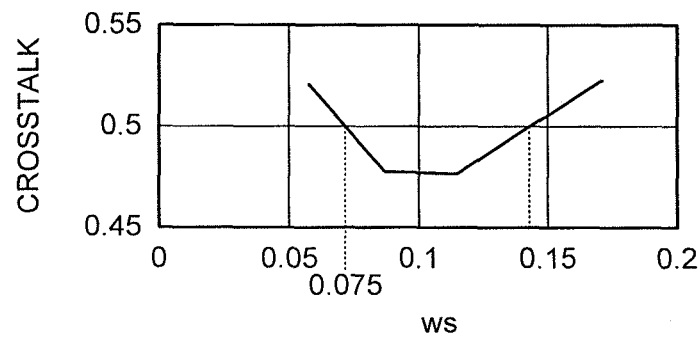
FIG. 9 is a graph showing crosstalk dependence with respect to the width ws of an end electrode of the liquid crystal lens.

In order to realize high resolution in the stereoscopic image display apparatus, it is required that the crosstalk be at least 0.5 or less. FIG. 8 and FIG. 9 are a graph illustrating crosstalk dependence with respect to the width wg of the center electrode 141, and a graph illustrating crosstalk dependence with respect to the width ws of the end electrode 142, respectively. As is clear from FIG. 8 and FIG. 9, it can be seen that for the crosstalk to be 0.5 or less, the relation of 0.075<ws<0.15 and 0.15<wg<0.29 is satisfied when the pitch (length L) of each liquid crystal lens 121 (122, 123) is 1.

From the above, in the stereoscopic image display apparatus 10 of this embodiment, crosstalk is low and a high visual field angle can be achieved with high resolution.

(Second Embodiment)

Figure 10:
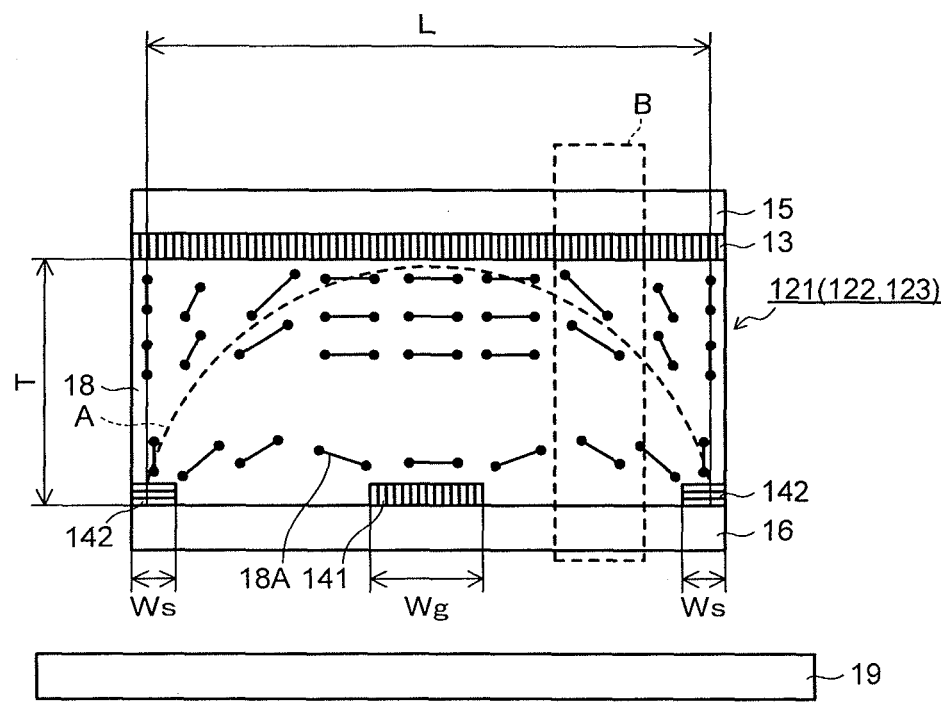
FIG. 10 is a stereoscopic image display apparatus of a second embodiment.

FIG. 10 is a schematic structural view of a stereoscopic image display apparatus in this embodiment. Note that the same reference numerals are used for similar to or same components as those of the stereoscopic image display apparatus illustrated in the first embodiment. Further, to clarify the characteristics of this embodiment, in FIG. 10 there are only illustrated a liquid crystal lens 121 (122, 123) and a polarized light directionvariable cell which is a characteristic part of this embodiment.

As illustrated in FIG. 10, in this embodiment, a polarized light direction variable cell 19 is provided on a lower (LCD 11) side of the liquid crystal lens 121 (122, 123) structured similarly to that of the first embodiment. Therefore, a light ray (image light) from the LCD 11 is passed through the polarized light direction variable cell 19. By rotating a polarized light direction by 90 degrees for example, the direction can be rendered orthogonal to the direction of the directors 18A of the liquid crystal of the liquid crystal lens 121 (122, 123). In this case, the degree of the image light passing through the center part of the liquid crystal lens 121 (122, 123) to be orthogonal to the directors 18A of the liquid crystal is high, and the degree of the image light to be orthogonal to the directors 18A of the liquid crystal decreases toward the end part of the liquid crystal lens 121 (122, 123).

As a result, the degree of reduction in refractive index increases from the end part of the liquid crystal lens 121 (122, 123) toward the center part. Consequently, the refractive index of the entire liquid crystal lens 121 (122, 123) becomes equal to the refractive index $N_0$ in the end part. Therefore, as illustrated in FIG. 10, in the case where the voltage is applied to the end electrodes 142 of the liquid crystal lens 121 (122, 123) to cause an ON state so that a stereoscopic image (three-dimensional image) is displayed, it is also possible to display a planar image (two-dimensional image) by changing the polarized light direction of the image light by the polarized light direction variable cell 19 to make the refractive index distribution of the liquid crystal lens 121 (122, 123) disappear and cause an OFF state.

(Third Embodiment)

Figure 11:
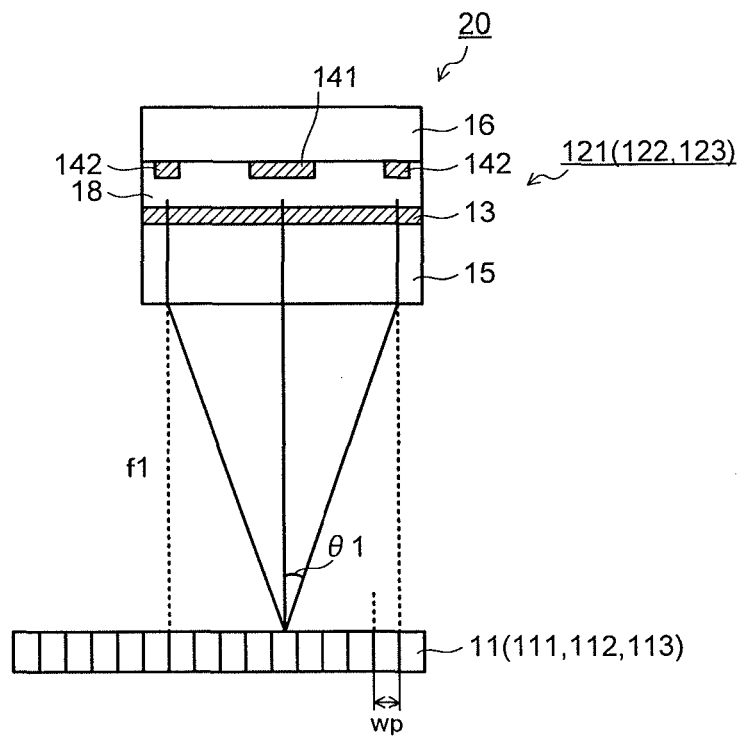
FIG. 11 is a stereoscopic image display apparatus of a third embodiment.
Figure 12:
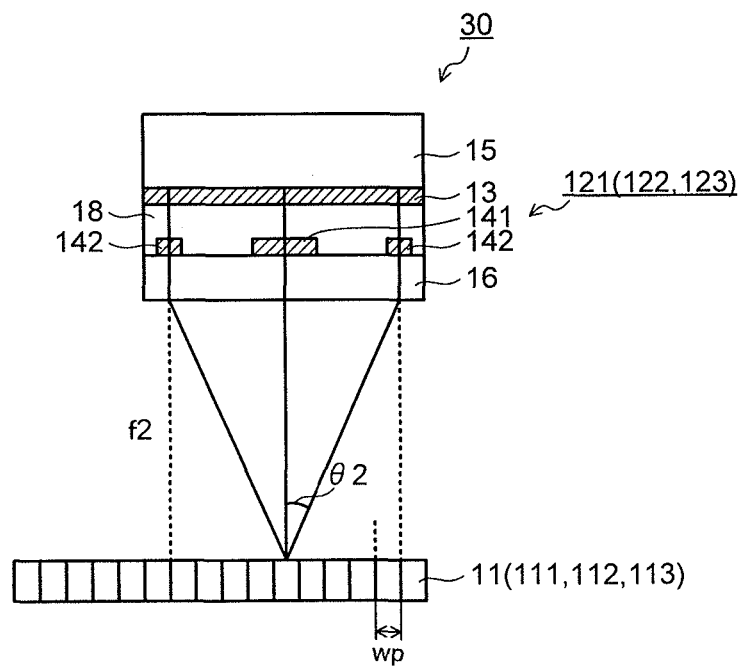
FIG. 12 is a stereoscopic image display apparatus of the third embodiment.

FIG. 11 and FIG. 12 are schematic structural views of stereoscopic image display apparatuses in this embodiment. Note that the same reference numerals are used for similar to or same components as those of the stereoscopic image display apparatus illustrated in the first embodiment. Further, to clarify the characteristics of this embodiment, in FIG. 10 and FIG. 11 there are only illustrated a liquid crystal lens 121 (122, 123) and the part of a pixel group 111 (112, 113) of the LCD 11 corresponding thereto.

In the first embodiment, the thicknesses of the transparent substrates 15 and 16 are the same as each other, but in this embodiment they are different from each other. Specifically, the thickness of the transparent electrode 15 on the side of the planar electrode 13 is larger than the thickness of the transparent electrode 16 on the side of the strip-shaped electrodes 141, 142. However, the thickness of the transparent electrode 16 may be larger than the thickness of the transparent electrode 15.

In this case, when the focal length f1 of the case where the transparent electrode 15 of the liquid crystal lens 121 (122, 123) is disposed toward the side of the LCD 11, that is, the pixel group 111 (112, 113) as illustrated in a stereoscopic image display apparatus 20 of FIG. 11 is compared with the focal length f2 of the case where the transparent electrode 16 of the liquid crystal lens 121 (122, 123) is disposed toward the side of the LCD 11, that is, the pixel group 111 (112, 113) as illustrated in a stereoscopic image display apparatus 30 of FIG. 12, the relation f1>f2 is satisfied. Therefore, the stereoscopic image display apparatus 30 illustrated in FIG. 12 can obtain a larger visual field angle than the stereoscopic image display apparatus 20 illustrated in FIG. 11.

Incidentally, the increase of the visual field angle by shortening the focal length between a lens and a display device in a stereoscopic image display apparatus is a publicly known technical fact for persons skilled in the art.

Next, the reason for the focal length f2 of the stereoscopic image display apparatus 30 illustrated in FIG. 12 being short as compared to the focal length f1 of the stereoscopic image display apparatus 20 illustrated in FIG. 11 will be described.

As illustrated in the area B of FIG. 3, regarding the director distribution of the liquid crystal, the directors of the liquid crystal which are on the side of the strip-shaped electrodes 141, 142 are often in a horizontal direction. On the side of the planar electrode 13, the directors of the liquid crystal are often inclined. When the director distribution thus changes in the thickness direction of the liquid crystal lens 121 (122, 123), that is, the liquid crystal layer 18, in the stereoscopic image display apparatus 30 illustrated in FIG. 12, a light ray incident perpendicularly on the liquid crystal lens 121 (122, 123) first bends largely due to the relatively high refractive index by passing through the inclined directors on the side of the transparent substrate 15.

Therefore, when the light ray finally passes through the directors in the horizontal direction on the side of the transparent substrate 16, it is incident at an incident angle inclined to a certain degree when passing through the directors. Even a relatively small refractive index distribution causes a relatively large bending. As a result, when the aforementioned light ray passes through the liquid crystal lens 121 (122, 123), it is emitted at an inclination of a relatively large angle θ2.

Figure 13:
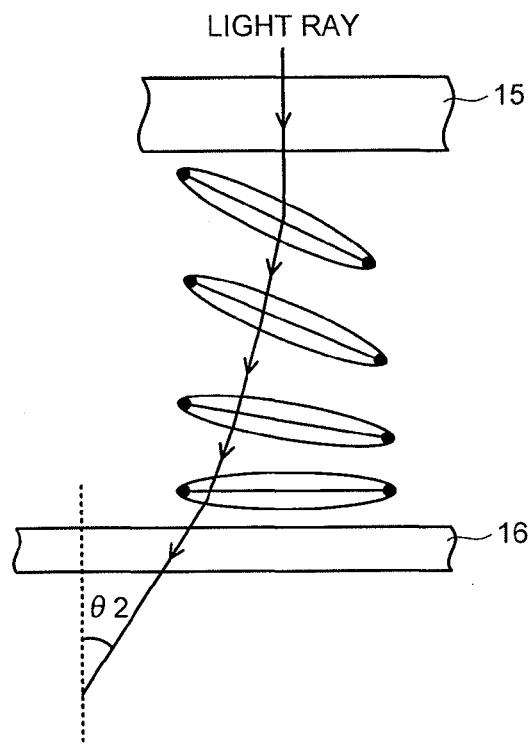
FIG. 13 is a conceptual diagram illustrating how a light ray passes and bends through a liquid crystal lens of the stereoscopic image display apparatus illustrated in FIG. 11.
Figure 14:
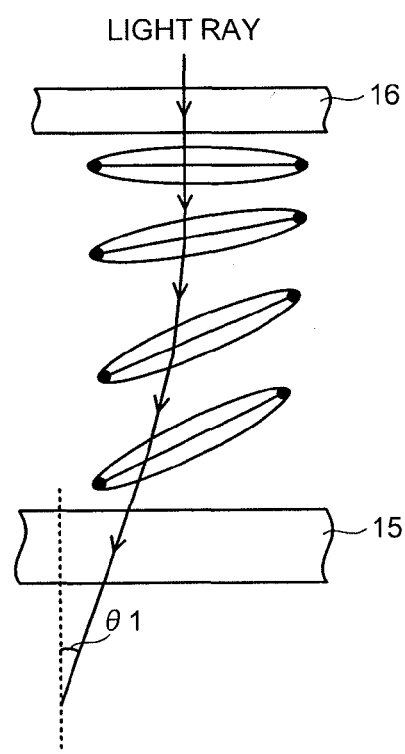
FIG. 14 is a conceptual diagram illustrating how a light ray passes and bends through a liquid crystal lens of the stereoscopic image display apparatus illustrated in FIG. 12.

Note that the concepts of how a light ray passes and bends through the above-described liquid crystal lens 121 (122, 123) are illustrated in FIG. 13 and FIG. 14.

On the other hand, in the stereoscopic image display apparatus 20 illustrated in FIG. 11, the light ray incident perpendicularly on the liquid crystal lens 121 (122, 123) first passes through the horizontal directors on the side of the transparent substrate 16, and hence it hardly bends. Thereafter, the light ray is bent gradually when passing through the inclined directors on the side of the planar electrode 15. As a result, when the light ray passes through the liquid crystal lens 121 (122, 123), it is emitted at an inclination of a relatively small angle θ1 (<θ2).

Note that the concepts of how a light ray passes and bends through the above-described liquid crystal lens 121 (122, 123) are illustrated in FIG. 13 and FIG. 14.

Therefore, as illustrated in FIG. 13 and FIG. 14, the magnitude relation of the focal length f1 and f2 is determined based on the magnitude relation (θ1<θ2) of emitting angles θ1 and θ2 of the incident light rays due to the degree of bending in the liquid crystal lens 121 (122, 123). That is, in the stereoscopic image display apparatus 30 illustrated in FIG. 12, the angle θ2 of the light ray emitted from the liquid crystal lens 121 (122, 123) is large, and thus the focal length f2 becomes short. In the stereoscopic image display apparatus 20 illustrated in FIG. 11, the angle θ1 of the light ray emitted from the liquid crystal lens 121 (122, 123) is large, and thus the focal length f1 becomes long compared to the focal length f2.

Note that in this embodiment, the reason for making the thickness of the transparent electrode 15 on the side of the planar electrode 13 larger than the thickness of the transparent electrode 16 on the side of the strip-shaped electrodes 141, 142 is to make the difference in focal length as described above become more significant in the stereoscopic image display apparatus 20 illustrated in FIG. 11 and the stereoscopic image display apparatus 30 illustrated in FIG. 12. When the thickness of the transparent substrate 16 is increased, the focal length will increase due to the thickness of the transparent substrate 16 even though the light ray is being bent as illustrated in FIG. 13 and FIG. 14. It is particularly significant in the stereoscopic image display apparatus 30 illustrated in FIG. 12. This cancels out the shortening of the focal length by the bending of the light ray.

Therefore, in this embodiment, the thickness of the transparent substrate 16 is made smaller than the thickness of the transparent substrate 15, so that the magnitude of the focal length due to the degree of bending in the liquid crystal lens 121 (122, 123) appears more significantly.

For example, in the above-described embodiments, the case where an LCD is used as the image display unit is described, but one in which a polarizing plate is provided on a display surface of a CRT, PDP, OLED, FED, or the like can be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stereoscopic image display apparatus, comprising:
an image display unit having a plurality of pixels;
a liquid crystal lens array, provided on the image display unit, including,
a pair of transparent substrates provided opposite to each other across a liquid crystal layer of the liquid crystal lens array,
a planar electrode provided on one of the pair of transparent substrates, and
strip-shaped electrodes provided on the other of the pair of transparent substrates at respective corresponding positions of the liquid crystal lens array,
wherein the strip-shaped electrodes are disposed at intervals in a pitch direction of the liquid crystal lens array such that end electrodes are located at both ends of each liquid crystal lens, and a center electrode is located at a center part of the liquid crystal lens;
and control unit configured to control potentials provided to the planar electrode and the center electrode, the difference of the potential between the planar electrode and the center electrode is set smaller than a rising voltage Vth of the liquid crystal layer;
wherein a third voltage V3 larger in absolute value than a first voltage V1 applied to the planar electrode and a second voltage V2 applied to the center electrode and also larger than the rising voltage is applied to the end electrodes; and
wherein, with a refractive index distribution being formed across an entire thickness direction of each liquid crystal lens, and the length in a pitch direction of the liquid crystal lens array being 1, the following relation is satisfied 0.075<ws<0.15

0.15<wg<0.29 where the width of the end electrodes is ws, and the width of the center electrode is wg.

2. The apparatus according to claim 1,
wherein the planar electrode and the center electrode are at ground potential.

3. The apparatus according to claim 1, further comprising a polarized light direction variable cell in a side of the image display unit with respect to the liquid crystal lens array.

4. The apparatus according to claim 1,
wherein the thicknesses of the pair of transparent substrates are different.

5. The apparatus according to claim 4,
wherein the other of the pair of transparent substrates has a smaller thickness than the one of the pair of transparent substrates.

6. A stereoscopic image display apparatus, comprising:
an image display unit having a plurality of pixels and emitting an image light having a polarized light;
a liquid crystal lens array provided on an emitting side of the image light of the image display unit;
a pair of transparent substrates provided opposite to each other across a liquid crystal layer of the liquid crystal lens array;
a planar electrode provided on one of the pair of transparent substrates; and
strip-shaped electrodes provided on the other of the pair of transparent substrates at respective corresponding positions of the liquid crystal lens array,
wherein the strip-shaped electrodes are disposed at intervals in a pitch direction of the liquid crystal lens array such that end electrodes are located at both ends of each liquid crystal lens, and a center electrode is located at a center part of the liquid crystal lens;
wherein the planar electrode is at ground potential;
wherein the relation 0>Vcp>−Vth is satisfied where Vcp is the potential of the center electrode, and Vth is the rising voltage of the liquid crystal layer;
wherein the end electrodes are set to potential larger in absolute value than the potential Vcp of the center electrode and the rising voltage Vth; and
wherein, with a refractive index distribution being formed across an entire thickness direction of each liquid crystal lens, and the length in a pitch direction of the liquid crystal lens array being 1, the following relation is satisfied 0.075<ws<0.15

0.15<wg<0.29 where the width of the end electrodes is ws, and the width of the center electrode is wg.

7. The apparatus according to claim 6, further comprising a polarized light direction variable cell in a side of the image display unit with respect to the liquid crystal lens array.

8. The apparatus according to claim 6,
wherein the thicknesses of the pair of transparent substrates are different.

9. The apparatus according to claim 8,
wherein the other of the pair of transparent substrates has a smaller thickness than the one of the pair of transparent substrates.

* * * * *